(12) United States Patent
Ito et al.

(10) Patent No.: US 6,707,573 B1
(45) Date of Patent: Mar. 16, 2004

(54) IMAGE PROCESSING APPARATUS AND METHOD, AND TRANSFER MEDIUM

(75) Inventors: Masahiko Ito, Chiba (JP); Naoya Kato, Chiba (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/186,669

(22) Filed: Nov. 4, 1998

(30) Foreign Application Priority Data

Nov. 6, 1997 (JP) .............................................. 9-303238

(51) Int. Cl.[7] .............................................. G06F 13/00
(52) U.S. Cl. ........................ 358/1.9; 358/501; 358/504; 382/162
(58) Field of Search ........................ 358/1.9, 501, 504, 358/518, 527, 537, 909.1, 448, 500; 382/162

(56) References Cited

U.S. PATENT DOCUMENTS

| | | | | |
|---|---|---|---|---|
| 4,803,496 A | * | 2/1989 | Kawakami et al. ............ | 346/76 |
| 4,812,879 A | * | 3/1989 | Suzuki ........................ | 355/58 |
| 4,958,220 A | * | 9/1990 | Alessi et al. ................. | 358/527 |
| 4,979,032 A | * | 12/1990 | Alessi et al. ................. | 358/527 |
| 5,072,291 A | * | 12/1991 | Sekizawa ..................... | 358/75 |
| 5,267,030 A | * | 11/1993 | Giorgianni et al. ......... | 358/527 |
| 5,272,543 A | * | 12/1993 | Yanagisawa ................ | 358/403 |
| 5,276,779 A | | 1/1994 | Statt ............................. | 345/617 |
| 5,309,257 A | * | 5/1994 | Bonino et al. .............. | 358/504 |
| 5,329,383 A | * | 7/1994 | Collette ....................... | 358/500 |
| 5,339,176 A | | 8/1994 | Smilansky et al. .......... | 358/504 |
| 5,349,452 A | * | 9/1994 | Maeda et al. ................ | 358/527 |
| 5,420,979 A | * | 5/1995 | Madden et al. ............. | 395/162 |
| 5,434,684 A | * | 7/1995 | Sugiyama ................... | 358/527 |
| 5,452,111 A | * | 9/1995 | Giorgianni et al. ......... | 358/504 |
| 5,481,655 A | * | 1/1996 | Jacobs ......................... | 358/1.9 |
| 5,521,723 A | * | 5/1996 | Madden et al. .............. | 358/501 |
| 5,572,632 A | * | 11/1996 | Laumeyer et al. .......... | 395/116 |
| 5,606,432 A | * | 2/1997 | Ohtsuka et al. ............. | 358/527 |
| 5,734,801 A | | 3/1998 | Noguchi et al. ............. | 358/1.9 |
| 5,754,184 A | * | 5/1998 | Ring et al. ................... | 345/431 |
| 5,758,043 A | * | 5/1998 | Takizawa et al. ........... | 395/115 |
| 6,031,641 A | * | 2/2000 | Hoshino ...................... | 358/521 |
| 6,108,095 A | * | 8/2000 | Graf ............................ | 356/425 |
| 6,118,455 A | * | 9/2000 | Hidaka et al. ............... | 345/431 |
| 6,151,135 A | * | 11/2000 | Tanaka et al. ............... | 358/1.9 |
| 6,188,786 B1 | * | 2/2001 | Ueda et al. .................. | 382/165 |
| 6,373,531 B1 | | 4/2002 | Hidaka et al. .............. | 348/602 |

FOREIGN PATENT DOCUMENTS

| | | | | |
|---|---|---|---|---|
| EP | 0599495 AO | * | 6/1994 | ............ H04N/1/46 |
| EP | 0915615 | | 11/1998 | ............ H04N/1/60 |
| WO | WO 92/17982 | | 10/1992 | |
| WO | WO-92/17982 | * | 10/1992 | ............ H04N/1/46 |
| WO | WO-97/34409 | * | 9/1997 | ............ H04N/1/46 |

* cited by examiner

*Primary Examiner*—Mark Wallerson
(74) *Attorney, Agent, or Firm*—Frommer Lawrence & Haug LLP; William S. Frommer; Gordon Kessler

(57) ABSTRACT

An image on the original to be printed on a print sheet $P_{in}$ by a printing machine is scanned by a scanner, and the data is edited by an editing section. The edited data is converted from the data dependent on the device (printing machine) to data not dependent on the device with the use of a device profile $P_1$ which a converter has. A luminous-environment conversion circuit compensates the data sent from the converter according to the data corresponding to surrounding light, output from a sensor $S_1$, and data related to the paper color of the print sheet $P_{in}$, output from the sensor $S_2$. Another luminous-environment conversion circuit compensates input data according to the paper color of a print sheet $P_{out}$ in a printer or surrounding-light data, output from sensors $S_3$ and $S_4$. Another converter converts the output of the luminous-environment conversion circuit to data dependent on the printer and the data is printed on the print sheet $P_{out}$ by the printer.

9 Claims, 16 Drawing Sheets

IMAGE PROCESSING APPARATUS AND METHOD, AND TRANSFER MEDIUM

BACKGROUND OF THE INVENTION

1. Field of the Invention

The present invention relates to image processing apparatuses and methods, and transfer media, and more particularly, to an image processing apparatus, an image processing method, and a transfer medium which match the appearance of an image on a hard copy to be output from a first image output apparatus to the appearance of an image on a hard copy to be output from a second image output apparatus to allow the appearance of the image obtained from the second image output apparatus to be adjusted without actually outputting the image from the second image output apparatus.

2. Description of the Related Art

FIG. 13 shows a processing flow in conventional printing. As shown in the figure, the original to be printed by a printer is prepared. This original is read by a scanner, a digital camera, or others, and edited by an editing apparatus such as a personal computer. The edited image data is printed on a sheet by a printer which is simpler than a printing machine used for final printing and output as a comp output. The editor checks the layout of characters and a picture by this comp output. When the desired layout is achieved, the image is output on a film. Then, a proof lithographic plate is created from the film and the image is printed on a sheet by a flatbed proof machine with the use of the proof lithographic plate. Color-matching check is performed by the image printed on the sheet by the flatbed proof machine. If the desired color is not obtained, the processing flow returns to editing. Comp output, film output, printing with a proof lithographic plate, and color-matching check are again performed for the edited image.

When the image printed by the flatbed proof machine has the desired color, a final lithographic plate is created from the output film and printing is performed by the printing machine used for final printing with the use of the final lithographic plate.

With the use of this printing flow, since it takes a long time from editing to color-matching check, quick printing is difficult. Therefore, for example, a printing flow shown in FIG. 14 is considered.

In the processing shown in FIG. 14, the original is read by a scanner, a digital camera, or others and input to an editing apparatus such as a personal computer. After the original is edited by the editing apparatus, image data thereof is printed on a sheet as digital proofs by a simple digital printer. Not only the layout of characters and a picture is checked but also color-matching check is performed with the use of the digital proofs. Until the desired layout and the desired color are obtained, the processing of editing and outputting digital proofs is repeated.

When the desired layout and the desired color are obtained, the image is output on a film, a lithographic plate is created based on the film, and printing is performed by a printing machine with the use of the lithographic plate.

With this printing flow, quicker printing can be performed. In addition, a flatbed proof machine, which is conventionally required for color-matching check, becomes unnecessary.

To implement the above printing processing, however, it is necessary to match the color on the digital proofs to the color of the image to be printed by the printing machine. To this end, the principle of a color management system (CMS) can be used.

FIG. 15 shows the principle of this conventional CMS. As shown in the figure, each device has a device profile. With this device profile, data dependent on the characteristics of the device, device dependent color (DDC) data or device dependent data (DDD)(hereinafter collectively called DDC data), is converted to data independent from the device, device independent color (DIC) data or device independent data (DID) (hereinafter collectively called DIC data), or vice versa.

When an image on the original is read by a scanner, the image data is obtained as DDC data dependent on the scanner. This DDC data is edited by an editing apparatus to obtain image data which is indicated by an input image color signal D11 in FIG. 16.

This input image color signal D11 is converted to a color signal D12 independent from a printing machine by the use of the device profile corresponding to the characteristics of the printing machine.

This color signal D12, which is independent from the printing machine, is converted, for example, to an output image color signal D13 which is DDC data dependent on a digital printer by the use of the device profile of the digital printer and printed on a print sheet by the printer.

As described above, the color of the image read by the scanner, edited, and to be printed on a print sheet by the printing machine and the color of the image (digital proofs) printed on another print sheet by the printer come to have the corresponding (matched) measured color value. Therefore, color-matching check can be achieved by the color of the digital proofs, which is used as the color of the image to be printed by the printing machine.

If the color of a print sheet used for printing by the printing machine or the color of an observation light source used therefor differs from the color of another print sheet used for printing by the printer or the color of an observation light source used therefor, the appearances of both images vary. Therefore, it is difficult to achieve correct color-matching check of a printed image by the digital proofs.

SUMMARY OF THE INVENTION

Accordingly, it is an object of the present invention to provide an image processing apparatus which allows simple and quick color-matching check.

Another object of the present invention is to provide an image processing method which allows simple and quick color-matching check.

Yet another object of the present invention is to provide a transfer medium for transferring a computer program which allows simple and quick color-matching check.

One of the foregoing objects is achieved in one aspect of the present invention through the provision of an image processing apparatus for matching the appearance of an image on a first hard copy to be output from a first image output apparatus to the appearance of an image on a second hard copy to be output from a second image output apparatus, including: first obtaining means for obtaining the color of the paper of the first hard copy and luminous-environment data; second obtaining means for obtaining the color of the paper of the second hard copy and luminous-environment data; first conversion means for converting the DDC data of the image to be output on the second hard copy into DIC data; compensation means for compensating the DIC data according to the luminous-environment data obtained by the first obtaining means and the luminous-environment data obtained by the second obtaining means; and second conversion means for converting the DIC data compensated by the compensation means to DDC data.

One of the foregoing objects is achieved in another aspect of the present invention through the provision of an image processing method for matching the appearance of an image on a first hard copy to be output from a first image output apparatus to the appearance of an image on a second hard copy to be output from a second image output apparatus, including: a first obtaining step for obtaining the color of the paper of the first hard copy and luminous-environment data; a second obtaining step for obtaining the color of the paper of the second hard copy and luminous-environment data; a first conversion step for converting the DDC data of the image to be output on the second hard copy into DIC data; a compensation step for compensating the DIC data according to the luminous-environment data obtained in the first obtaining step and the luminous-environment data obtained in the second obtaining step; and a second conversion step for converting the DIC data compensated in the compensation step to DDC data.

One of the foregoing objects is achieved in yet another aspect of the present invention through the provision of a transfer medium for transferring a computer program used for an image processing apparatus which matches the appearance of an image on a first hard copy to be output from a first image output apparatus to the appearance of an image on a second hard copy to be output from a second image output apparatus, the computer program including: a first obtaining step for obtaining the color of the paper of the first hard copy and luminous-environment data; a second obtaining step for obtaining the color of the paper of the second hard copy and luminous-environment data; a first conversion step for converting the DDC data of the image to be output on the second hard copy into DIC data; a compensation step for compensating the DIC data according to the luminous-environment data obtained in the first obtaining step and the luminous-environment data obtained in the second obtaining step; and a second conversion step for converting the DIC data compensated in the compensation step to DDC data.

According to the present invention, based on the luminous-environment data for the first hard copy and that for the second hard copy, the DIC data output on the second hard copy is compensated. The compensated DIC data is converted to DDC data.

As described above, according to the present invention, since compensation is performed with the paper color and the luminous environments being taken into account, the appearances of two hard copies can be matched. Therefore, when the present invention is applied to printing, quick color-matching check is allowed and printing can be finished within a short period.

DESCRIPTION OF THE PREFERRED EMBODIMENTS

Figure 1:
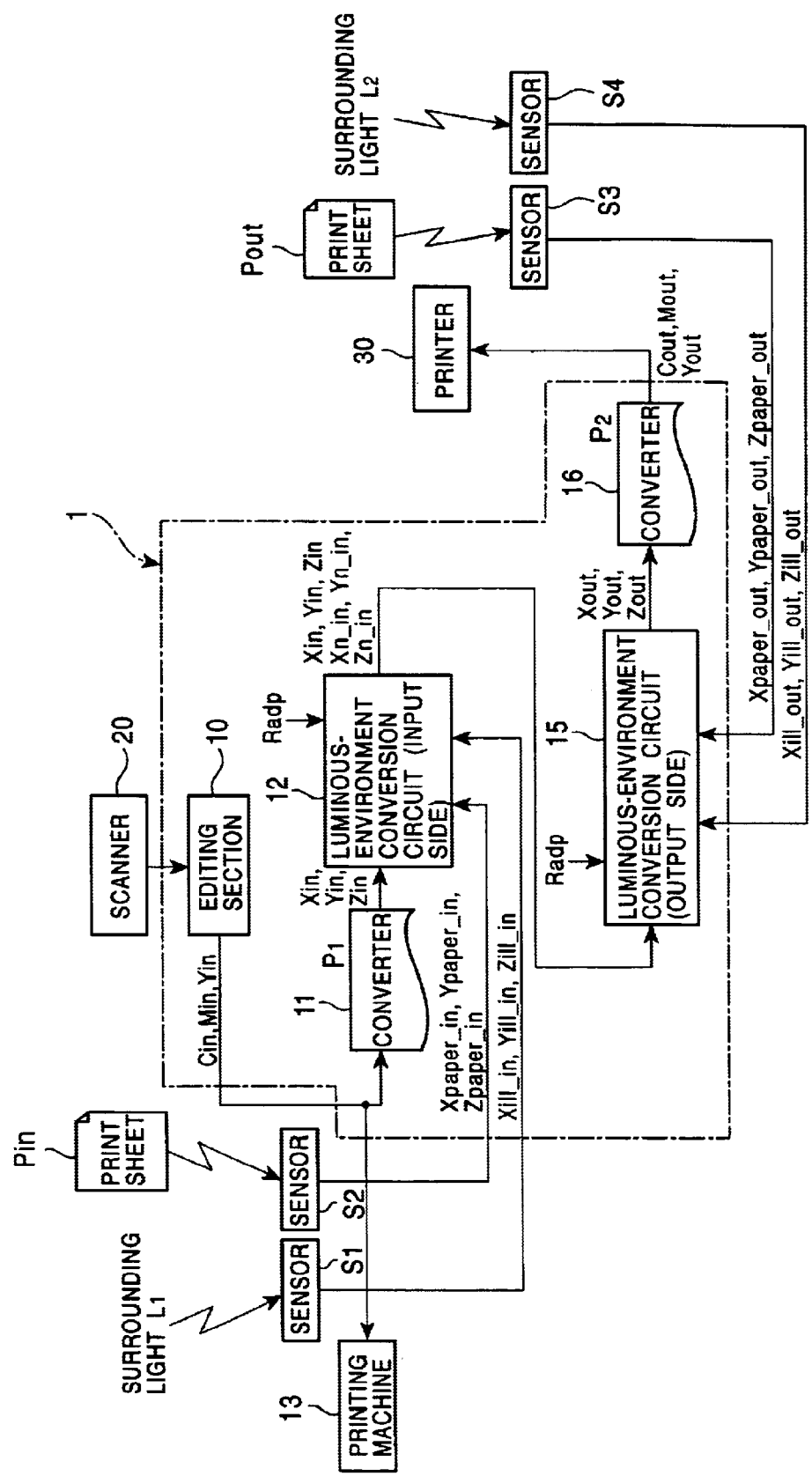
FIG. 1 is a block diagram of a configuration example of an image processing apparatus to which the present invention is applied.

Embodiments of the present invention will be described below. To clarify the correspondence between each means of the present invention described in claims and the following embodiments, the features of the present invention will be described below with an embodiment (one example only) corresponding to each means being added in parentheses after each means. It is a matter of course that each means is not limited to that described below.

An image processing apparatus according to the present invention, which matches the appearance of an image on a first hard copy (for example, a print sheet $P_{out}$ shown in FIG. 1) to be output from a first image output apparatus (for example, a printer 30 shown in FIG. 1) to the appearance of an image on a second hard copy (for example, a print sheet $P_{in}$ shown in FIG. 1) to be output from a second image output apparatus (for example, a printing machine 13 shown in FIG. 1), includes: first obtaining means (for example, sensors $S_3$ and $S_4$ shown in FIG. 1) for obtaining the color of the paper of the first hard copy and luminous-environment data; second obtaining means (for example, sensors $S_1$ and $S_2$ shown in FIG. 1) for obtaining the color of the paper of the second hard copy and luminous-environment data; first conversion means (for example, a converter 11 shown in FIG. 1) for converting the DDC data of the image to be output on the second hard copy into DIC data; compensation means (luminous-environment conversion circuits 12 and 15) for compensating the DIC data according to the luminous-environment data obtained by the first obtaining means and the luminous-environment data obtained by the second obtaining means; and second conversion means (for example, a converter 16 shown in FIG. 1) for converting the DIC data compensated by the compensation means to DDC data.

FIG. 1 shows a configuration example of an image processing apparatus to which the present invention is applied. In this image processing apparatus, a printing machine 13 serves as an input device and a printer 30 serves as an output device. Specifically, a scanner 20 reads an image of the original to be printed by the printing machine 13 and an image processing apparatus 1 performs image processing. The image data to which the image processing has been applied is output by the printer 30 on a print sheet $P_{out}$. When the color of the image printed on the print sheet $P_{out}$ is compensated and the desired color is obtained, the image data edited by the image processing apparatus 1 is output by the printing machine 13 on a print sheet $P_{in}$. Of course, the image data is first output on a film, a lithographic plate is then created from this film, and printing is performed with the use of this lithographic plate. In FIG. 1, for the convenience of description, the output of the image processing apparatus 1 is directly supplied to the printing machine 13.

The scanner 20 reads an image on the original to be printed by the printing machine 13. The image color signal is an RGB (red, green, and blue) signal dependent on the device (scanner) or a CMYK (cyan, magenta, yellow, and black, sometimes K is missing) signal dependent on the device. For example, CMY data is sent to the image processing apparatus 1.

The image processing apparatus 1 configured, for example, by a personal computer, is formed of an editing section 10, a converter 11 luminous-environment conversion circuits 12 and 15, and a converter 16. The editing section 10 edits the CMY data input from the scanner 20, according to the input of the user (editor). The converter 11 stores a profile $P_1$ for the printing machine 13 generated in advance. The converter 11 converts the CMY data serving as DDC data sent from the editing section 10 into XYZ data serving as DIC data by referencing the profile $P_1$ and sends it to the luminous-environment conversion circuit 12.

In addition to the XYZ data sent from the converter 11, the outputs of a sensor $S_1$ and a sensor $S_2$ are also sent to the luminous-environment conversion circuit 12. The sensor $S_1$ is configured, for example, by a radiation color luminance meter. The sensor $S_1$ measures the chromaticity of surrounding light L (for example, light of a fluorescent lamp) in the environment where the printing machine 13 is installed, and sends it as a luminous-environment parameter to the luminous-environment conversion circuit 12. The sensor $S_2$ is formed, for example, of a contact-type sensor. The sensor $S_2$ measures the chromaticity of a white point on the print sheet $P_{in}$ of the printing machine 13 and outputs the measured chromaticity to the luminous-environment conversion circuit 12.

The luminous-environment conversion circuit 12 applies compensation processing corresponding to the appearance of color in the luminous environment for the print sheet $P_{in}$ to the XYZ data sent from the converter 11 according to the luminous-environment parameters sent from the sensors $S_1$ and $S_2$, and outputs as data ($X_{n\_in}$, $Y_{n\_in}$, $Z_{n\_in}$) (details thereof will be described later) to the luminous-environment conversion circuit 15.

The luminous-environment conversion circuit 15 receives data from the luminous-environment conversion circuit 12, and the output signals of sensors $S_3$ and $S_4$. The sensor $S_3$ measures the chromaticity of a white point on the print sheet $P_{out}$ of the printer 30 and outputs the measured chromaticity to the luminous-environment conversion circuit 15. The sensor $S_4$ measures, for example, the chromaticity of surrounding light $L_2$ (for example, light of a fluorescent lamp) in the environment where the printer 30 is installed, and sends it as a luminous-environment parameter to the luminous-environment conversion circuit 15.

The luminous-environment conversion circuit 15 handles the data sent from the luminous-environment conversion circuit 12 according to the luminous-environment parameters sent from the sensors $S_3$ and $S_4$ such that the appearance of color in the luminous environment of the printer 30 matches the appearance of color in the luminous environment of the printing machine 13. The resultant data is sent to the converter 16.

The converter 16 stores a profile $P_2$ created in advance for the printer 30. The XYZ data sent from the luminous-environment conversion circuit 15 is converted, for example, to CMY data serving as DDC data for the printer 30 with the profile $P_2$ being referenced and sent to the printer 30.

With these functions, the printer 30 prints on the print sheet $P_{out}$ an image which has substantially the same color appearance as the image printed on the print sheet $P_{in}$. Color-matching check can thus be achieved.

Figure 2:
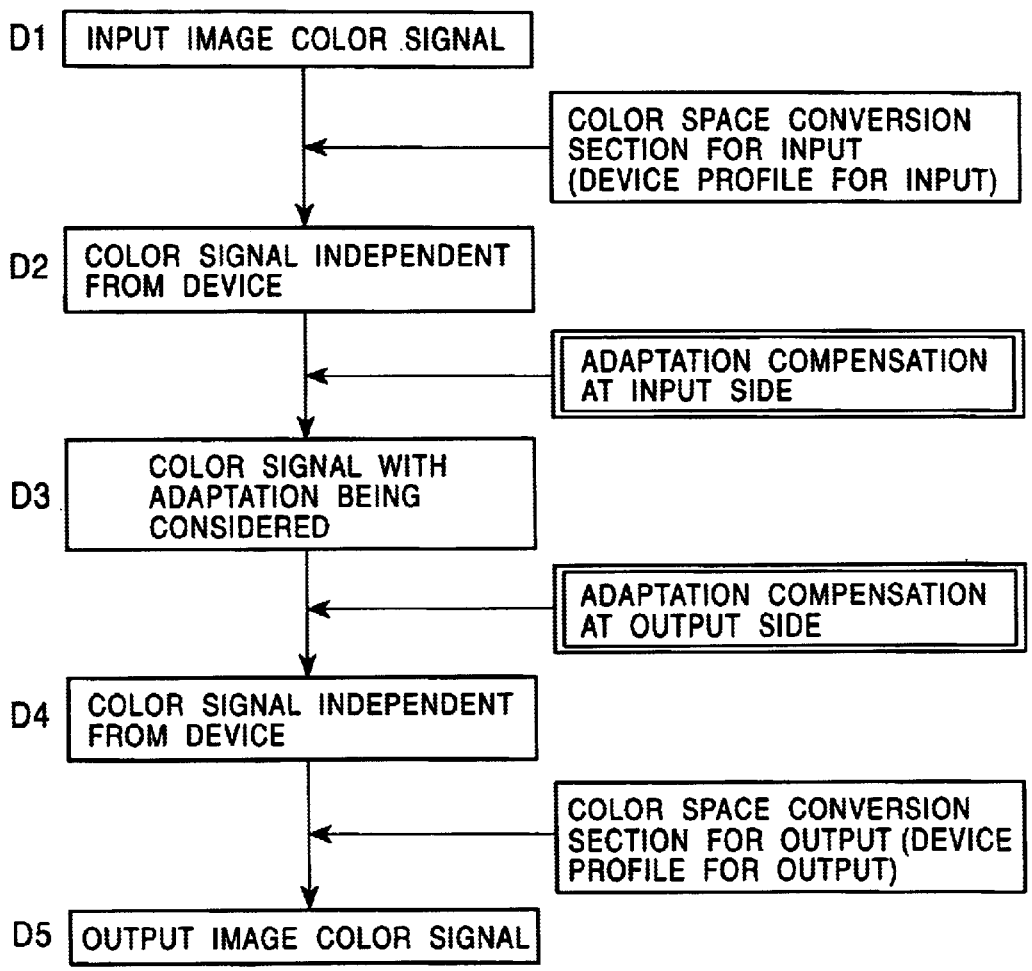
FIG. 2 is a view used for describing an operation of the configuration example shown in FIG. 1.

An operation thereof will be described next. The scanner 20 reads an image on the original (not shown) and outputs an image color signal as DDC data. The editing section 10 in the image processing apparatus 1 edits the output of the scanner 20 and generates an input image color signal D1 shown in FIG. 2. This input image color signal D1, which is expressed as ($C_{in}$, $M_{in}$, $Y_{in}$), is sent to the converter 11 and converted to a color signal D2 which is independent from the device according to the profile $P_1$ of the printing machine 13. In other words, the converter 11 performs calculation according to the following expression to output ($X_{in}$, $Y_{in}$, $Z_{in}$).

$$\begin{pmatrix} X_{in} \\ Y_{in} \\ Z_{in} \end{pmatrix} = LUT_N \begin{pmatrix} C_{in} \\ M_{in} \\ Y_{in} \end{pmatrix} \quad (1)$$

In the present specification, a look-up table (LUT) used for converting a color signal dependent on a device to a color signal independent from the device is called a forward-direction table. Conversely, an LUT used for converting a color signal independent from a device to a color signal dependent on the device is called a backward-direction table.

The data ($X_{in}$, $Y_{in}$, $Z_{in}$), which is the color signal D2 independent from the device and generated by the converter 11, is input to the luminous-environment conversion circuit 12. Adaptive compensation processing is applied to the data and the data is converted to a color signal D3 with adaptation being considered. In other words, the luminous-environment conversion circuit 12 applies an adaptation rate $R_{adp}$, indicating the degree at which the sense of human sight adapts to paper color, to three stimulus values ($X_{ill\_in}$, $Y_{ill\_in}$, $Z_{ill\_in}$) of the surrounding light $L_1$ input from the sensor $S_1$ and three stimulus values ($X_{paper\_in}$, $Y_{paper\_in}$, $Z_{paper\_in}$) of the paper color of the print sheet $P_{in}$ input from the sensor $S_2$ to calculate a white point which the sense of human sight actually adapts to, by the following expressions.

$$X_{n\_in} = R_{adp} \cdot X_{paper\_in} + (1 - R_{adp}) \cdot X_{ill\_in}$$

$$Y_{n\_in} = R_{adp} \cdot Y_{paper\_in} + (1 - R_{adp}) \cdot Y_{ill\_in}$$

$$Z_{n\_in} = R_{adp} \cdot Z_{paper\_in} + (1 - R_{adp}) \cdot Z_{ill\_in} \quad (2)$$

Namely, in the present embodiment, it is assumed that the sense of human sight partially adapts to both the paper color and the color temperature of the surrounding light source, and the white point to which the sense of human sight actually adapts is located at the middle of the paper color and the color temperature of the surrounding light source.

In the expression (2), an adaptation rate $R_{adp}$ of 1.0 indicates that the sense of human sight 100% adapts to paper color, and an adaptation rate $R_{adp}$ of 0.0 indicates that the sense of human sight 100% adapts to an observation light source.

An adaptation rate $R_{adp}$ of 0.5 indicates that the sense of human sight adapts to just the middle of the paper color and the observation light source. Image processing in which both the paper color and the observation light source are taken into account is applied to achieve best color compensation. It is found from an experiment that the best adaptation rate Radp ranges from 0.25 to 0.75.

The luminous-environment conversion circuit 12 outputs the data $(X_{in}, Y_{in}, Z_{in})$ input from the converter 11 as well as the color-signal data $(X_{n\_in}, Y_{n\_in}, Z_{n\_in})$ in which adaptation has been considered, to the luminous-environment conversion circuit 15.

The luminous-environment conversion circuit 15 applies adaptation compensation processing for the printer 30 to the input color signal D3, in which adaptation has been considered, to generate a color signal D4 independent from the device.

In other words, the luminous-environment conversion circuit 15 applies an adaptation rate $R_{adp}$ to three stimulus values $(X_{paper\_out}, Y_{paper\_out}, Z_{paper\_out})$ of the paper color of the print sheet $P_{out}$ output from the sensor $S_3$ and three stimulus values $(X_{ill\_out}, Y_{ill\_out}, Z_{ill\_out})$ of the surrounding light source $L_2$ output from the sensor $S_4$ to perform calculation according to the following expressions.

$$X_{n\_out} = R_{adp} \cdot X_{paper\_out} + (1-R_{adp}) \cdot X_{ill\_out}$$

$$Y_{n\_out} = R_{adp} \cdot Y_{paper\_out} + (1-R_{adp}) \cdot Y_{ill\_out}$$

$$Z_{n\_out} = R_{adp} \cdot Z_{paper\_out} + (1-R_{adp}) \cdot Z_{ill\_out} \quad (3)$$

In addition, the luminous-environment conversion circuit 15 calculates by the following expressions data $(X_{out}, Y_{out}, Z_{out})$, which is a color signal independent from the device, from the data $(X_{in}, Y_{in}, Z_{in})$ and the data $(X_{n\_in}, Y_{n\_in}, Z_{n\_in})$ input from the luminous-environment conversion circuit 12 and the data $(X_{n\_out}, Y_{n\_out}, Z_{n\_out})$ calculated according to the expression (3).

$$X_{out} = X_{in}(X_{n\_out}/X_{n\_in})$$

$$Y_{out} = Y_{in}(Y_{n\_out}/Y_{n\_in})$$

$$Z_{out} = Z_{in}(Z_{n\_out}/Z_{n\_in}) \quad (4)$$

The converter 16 applies the profile $P_2$ of the printer 30 to the color signal D4, independent from the device and input from the luminous-environment conversion circuit 15, to generate an output image color signal D5 dependent on the printer 30. The signal is sent to the printer 30 and printed on the print sheet $P_{out}$.

In other words, the converter 16 applies the profile $P_2$ of the printer 30 to the data $(X_{out}, Y_{out}, Z_{out})$, which is the color signal D4, independent from the device and input from the luminous-environment conversion circuit 15, to generate data $(C_{out}, M_{out}, Y_{out})$ dependent on the printer 30. Namely, the converter 16 performs calculation according to the following expression.

$$\begin{pmatrix} C_{out} \\ M_{out} \\ Y_{out} \end{pmatrix} = LUT_l \begin{pmatrix} X_{out} \\ Y_{out} \\ Z_{out} \end{pmatrix} \quad (5)$$

Since input and output are performed as described above with both the luminous environment and the paper color being taken into consideration, the appearances of the color images on the print sheet $P_{in}$ and the print sheet $P_{out}$ are matched.

Figure 3:
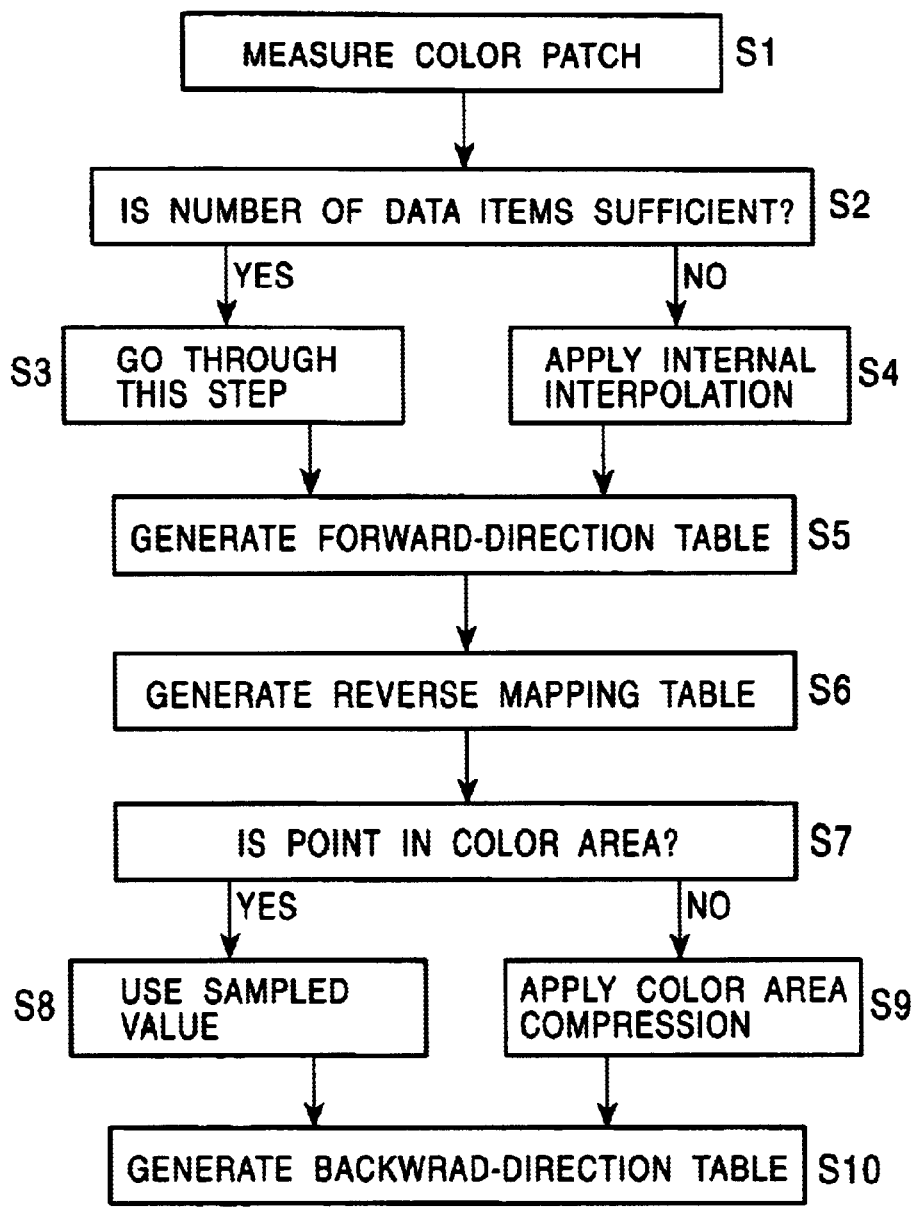
FIG. 3 is a flowchart describing a procedure for generating a look-up table.

FIG. 3 shows processing for generating a forward-direction table for the converter 11 and a backward-direction table for the converter 16. In a first step S1, color patches are measured. Namely, the original having $N^3$ color patches each of which has, for example, one of N levels of C, M, or Y color is prepared as the original printed by the printing machine 13 and the chromatic values (XYZ values) thereof are measured by a spectrometer. A device signal (C, M, Y) input to the printing machine 13 when each color-patch image is printed by the printing machine 13 is also measured.

In a step S2, it is determined whether a sufficient number of data items have been measured. When it is determined that a sufficient number of data items have been measured, processing such as internal interpolation is not applied in a step S3 and the procedure proceeds to a step S5. A forward-direction table is generated from the relationship between both.

On the other hand, if it is determined in the step S2 that the number of the data items is insufficient, a pseudo measured value is obtained by internal interpolation. In this case, high-order interpolation is usually used as the internal interpolation, which has higher interpolation precision than linear interpolation. When the internal interpolation is finished in a step S4, the procedure proceeds to the step S5 and a forward-direction table is generated.

When the forward-direction table is generated, the procedure proceeds to a step S6, and a reverse mapping table is generated from the forward-direction table. In other words, the value of each point in the forward-direction table, which is expressed in a CMY coordinate system, is placed in an XYZ coordinate system. In a step S7, it is determined whether each placed point is located within a color area. When it is within the color area, it is determined in a step S8 that the sampled values are used as is, and a backward-direction table is created in a step S10. If it is determined in the step S7 that each placed point is located out of the color area, the procedure proceeds to a step S9 and color-area compression processing is applied. Then, the procedure proceeds to the step S10 and a backward-direction table is generated. Namely, a backward-direction table (table expressed by XYZ coordinates) in a color area in which the printer can expresses the color is generated.

Figure 4:
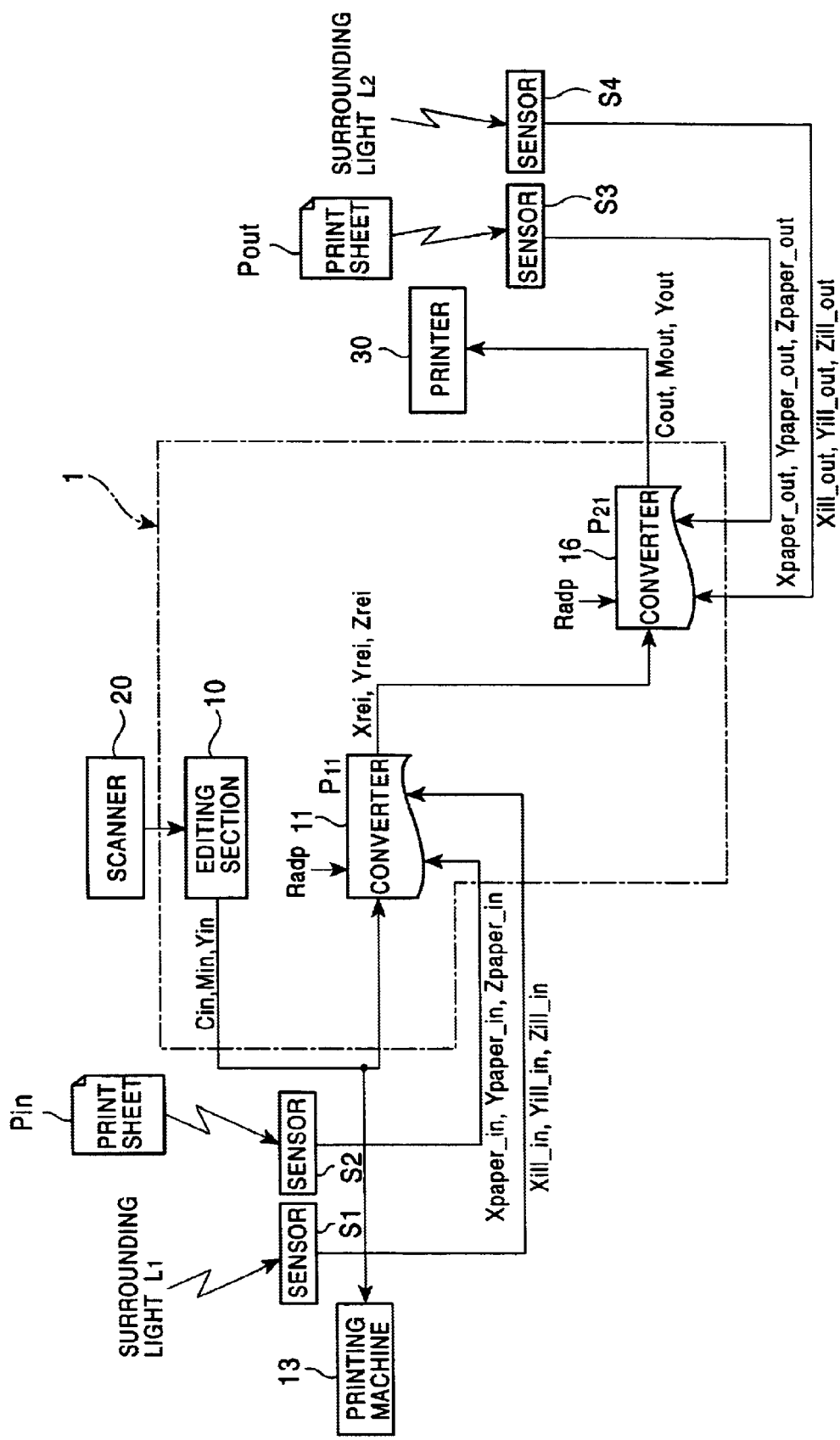
FIG. 4 is a block diagram of another configuration example of an image processing apparatus to which the present invention is applied.

FIG. 4 shows another embodiment of the present invention. In this embodiment, a profile $P_{11}$ for the printing machine 13 used in the converter 11 in the image processing apparatus 1 is generated with adaptation compensation in the printing machine 13 being taken into account. Therefore, the luminous-environment conversion circuit 12 in the embodiment shown in FIG. 1 is omitted. In the same way, a profile $P_{21}$ for the printer 30 used in the converter 16 is also generated with adaptation compensation in the printer 30 being taken into consideration. Therefore, the luminous-environment conversion circuit 15 in the embodiment shown in FIG. 1 is omitted. The other configurations are the same as those in the embodiment shown in FIG. 1.

Figure 5:
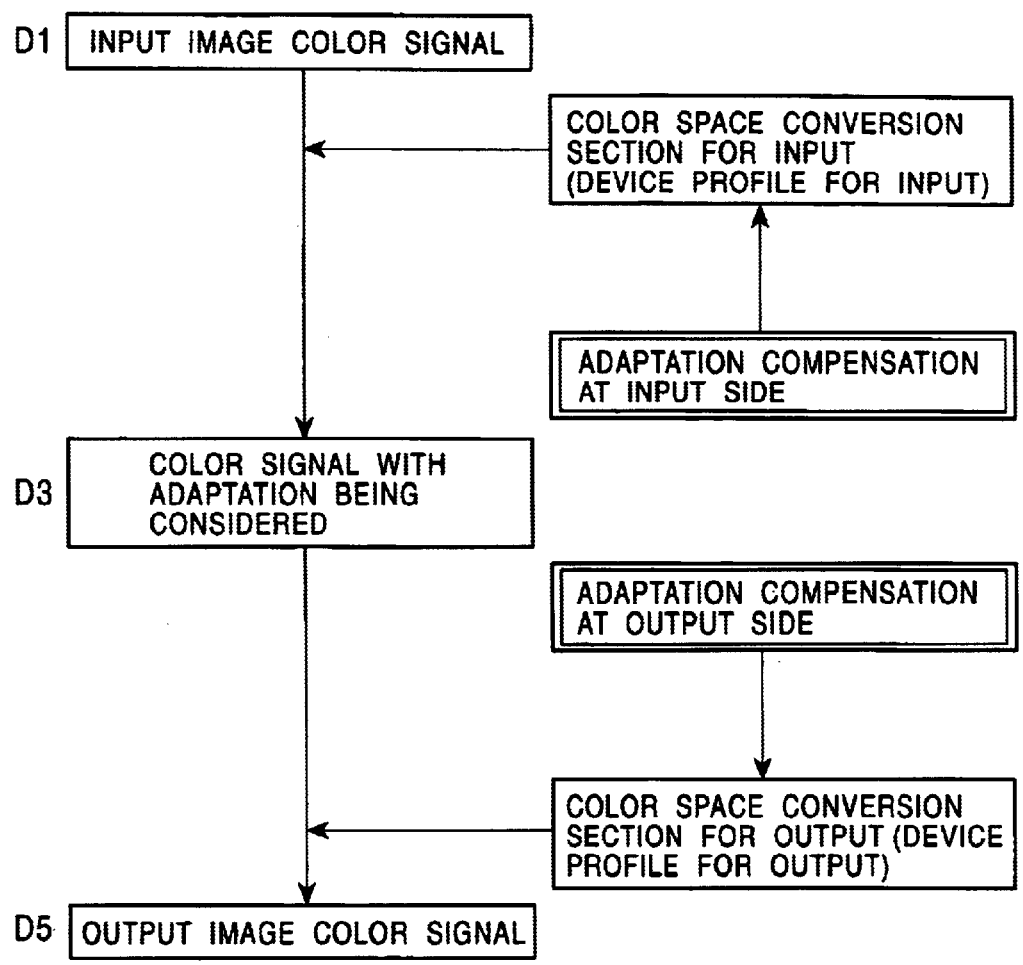
FIG. 5 is a view used for describing an operation of the configuration example shown in FIG. 4.

In the embodiment shown in FIG. 4, an input image color signal D1 is converted to a color signal D3 in which adaptation is considered, according to the profile $P_{11}$ in the converter 11 as shown in FIG. 5.

In the embodiment shown in FIG. 1, the LUT is generated from the relationship between the device color signals and the measured values. In the embodiment shown in FIG. 4, a measured value is converted to a perception amount in which an appearance is considered and an LUT is generated from the relationship between the perception amount and a device color signal.

In other words, a perception amount ($X_{rel}$, $Y_{rel}$, $Z_{rel}$) in the sense of human sight is expressed by the following expressions when a color having a measured value of ($X_{mesure}$, $Y_{mesure}$, $Z_{mesure}$) is observed in adaptation to a white point ($X_n$, $Y_n$, $Z_n$).

$$X_{rel} = X_{mesure}/X_n$$
$$Y_{rel} = Y_{mesure}/Y_n$$
$$Z_{rel} = Z_{mesure}/Z_n \quad (6)$$

The white point ($X_n$, $Y_n$, $Z_n$) is defined as follows, where paper color is indicated by ($Y_{paper}$, $Y_{paper}$, $Z_{paper}$) and an observation light source is expressed by ($X_{ill}$, $Y_{ill}$, $Z_{ill}$).

$$X_n = R_{adp} \cdot X_{paper} + (1-R_{adp}) \cdot X_{ill}$$
$$Y_n = R_{adp} \cdot Y_{paper} + (1-R_{adp}) \cdot Y_{ill}$$
$$Z_n = R_{adp} \cdot Z_{paper} + (1-R_{adp}) \cdot Z_{ill} \quad (7)$$

Therefore, an LUT needs to be generated from the perception amount in the expressions (6) and a device color signal.

An LUT serving as the profile $P_{21}$ in the converter 16 needs to be made as the backward-direction table of the LUT serving as the profile $P_{11}$ in the converter 11.

Therefore, in the embodiment shown in FIG. 4, the converter 11 performs the calculation indicated by the following expression to output data ($X_{rel}$, $Y_{rel}$, $Z_{rel}$).

$$\begin{pmatrix} X_{rel} \\ Y_{rel} \\ Z_{rel} \end{pmatrix} = LUT_N \begin{pmatrix} C_{in} \\ M_{in} \\ Y_{in} \end{pmatrix} \quad (8)$$

The converter 16 performs the calculation indicated by the following expression.

$$\begin{pmatrix} C_{out} \\ M_{out} \\ Y_{out} \end{pmatrix} = LUT_I \begin{pmatrix} X_{rel} \\ Y_{rel} \\ Z_{rel} \end{pmatrix} \quad (9)$$

As described above, the device profile is generated with the appearance being taken into account. Just by conversion with the device profile, the appearance can be matched.

In FIG. 5, the color signal D3, in which adaptation has been considered, is converted to an output image color signal D5, which depends on the printer 30, with the use of the profile $P_{21}$ in the converter 16.

Figure 6:
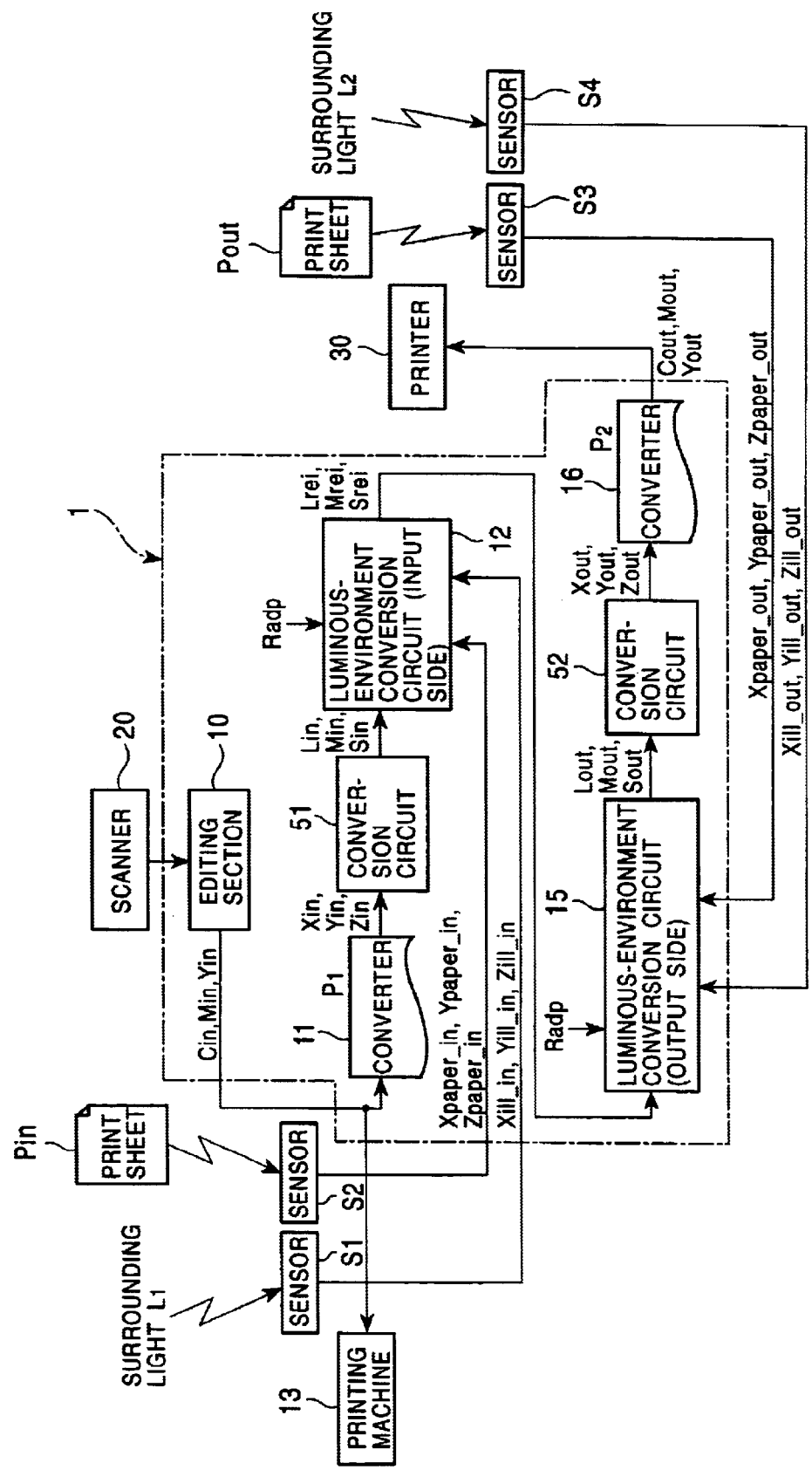
FIG. 6 is a block diagram of yet another configuration example of an image processing apparatus to which the present invention is applied.

FIG. 6 shows still another embodiment. In this embodiment, data output from the converter 11 is converted to a color signal LMS at a human pyramidal level by a conversion circuit 51, and input to the luminous-environment conversion circuit 12. In the same way, a color signal LMS at the human pyramidal level output from the luminous-environment conversion circuit 15 is converted to a color signal XYZ which is not dependent on a device by a conversion circuit 52, and input to the converter 16. The other configurations are the same as those in the case shown in FIG. 1.

Figure 7:
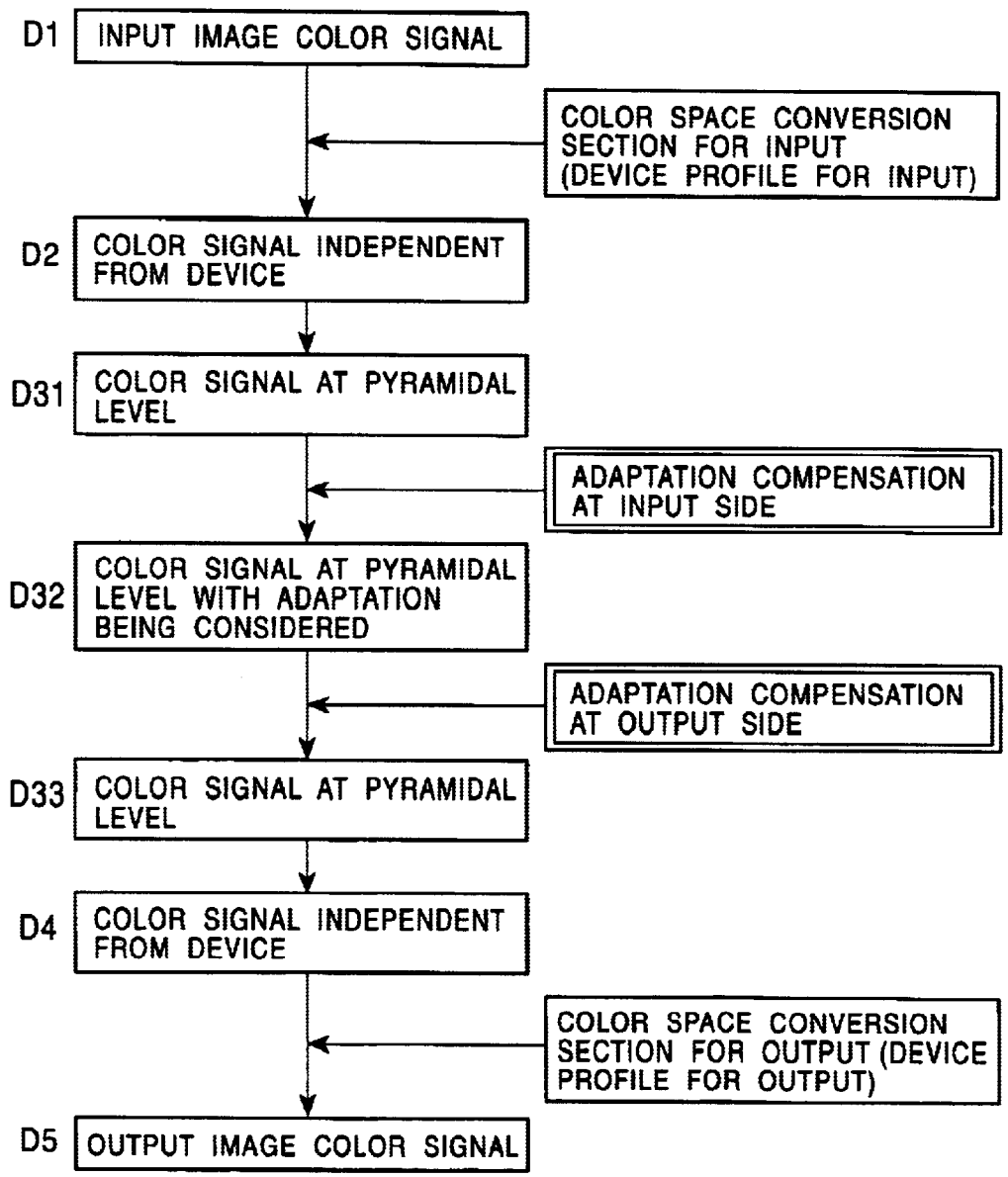
FIG. 7 is a view used for describing an operation of the configuration example shown in FIG. 6.

In other words, in this embodiment, an input image color signal D1 is converted to a color signal D2 independent from the device by the use of the profile $P_1$ in the converter 11 as shown in FIG. 7. Namely, calculation is performed according to the following expression.

$$\begin{pmatrix} X_{in} \\ Y_{in} \\ Z_{in} \end{pmatrix} = LUT_N \begin{pmatrix} C_{in} \\ M_{in} \\ Y_{in} \end{pmatrix} \quad (10)$$

The color signal D2, which is independent from the device, is converted to a color signal D31 at the pyramidal level by the conversion circuit 51.

In other words, the conversion circuit 51 performs the Hunt-Pointer-Estevez conversion, shown below, to generate the color signal ($L_{in}$, $M_{in}$, $S_{in}$) at the human pyramidal level.

$$\begin{pmatrix} L_{in} \\ M_{in} \\ S_{in} \end{pmatrix} = \begin{pmatrix} 0.38971 & 0.68898 & -0.07868 \\ -0.22981 & 1.18340 & 0.04641 \\ 0.0 & 0.0 & 1.0 \end{pmatrix} \begin{pmatrix} X_{in} \\ Y_{in} \\ Z_{in} \end{pmatrix} \quad (11)$$

The luminous-environment conversion circuit 12 performs adaptation compensation at the input side to generate a color signal D32 at the pyramidal level, in which adaptation is considered.

In other words, the luminous-environment conversion circuit 12 performs the calculation indicated by the following expressions with the use of the data ($X_{ill\_in}$, $Y_{ill\_in}$, $Z_{ill\_in}$) output from the sensor $S_1$, the data ($X_{paper\_in}$, $Y_{paper\_in}$, $Z_{paper\_in}$) output from the sensor $S_2$, and the adaptation rate $R_{adp}$.

$$L_{n\_in} = R_{adp} \cdot L_{paper\_in} + (1-R_{adp}) \cdot L_{ill\_in}$$
$$M_{n\_in} = R_{adp} \cdot M_{paper\_in} + (1-R_{adp}) \cdot M_{ill\_in}$$
$$S_{n\_in} = R_{adp} \cdot S_{paper\_in} + (1-R_{adp}) \cdot S_{ill\_in} \quad (12)$$

($L_{paper\_in}$, $M_{paper\_in}$, $S_{paper\_in}$) and ($L_{ill\_in}$, $M_{ill\_in}$, $S_{ill\_in}$) are obtained by applying the Hunt-Pinter-Estevez conversion, shown in the expression (11), to the data ($X_{paper\_in}$, $Y_{paper\_in}$, $Z_{paper\_in}$) output from the sensor $S_2$ and the data ($X_{ill\_in}$, $Y_{ill\_in}$, $Z_{ill\_in}$) output from the sensor $S_1$, respectively.

A white point ($L_{n\_in}$, $M_{n\_in}$, $S_{n\_in}$) obtained from the expression (12) is substituted into the Von Kries adaptation rule to perform the calculation indicated by the following expressions.

$$L_{rel} = L_{in}/L_{n\_in}$$
$$M_{rel} = M_{in}/M_{n\_in}$$
$$S_{rel} = S_{in}/S_{n\_in} \quad (13)$$

With this operation, data ($L_{rel}$, $M_{rel}$, $S_{rel}$) which is not dependent on the luminous environment is obtained.

The luminous-environment conversion circuit 15 applies adaptation compensation to this data to convert to a color signal D33 at the pyramidal level.

In other words, the luminous-environment conversion circuit 15 applies the following expressions to the data ($L_{rel}$, $M_{rel}$, $S_{rel}$), which is not dependent on the input luminous environment, to generate data ($L_{out}$, $M_{out}$, $S_{out}$).

$$L_{out} = L_{n\_out} \cdot L_{rel}$$

$$M_{out} = M_{n\_out} \cdot M_{rel}$$

$$S_{out} = S_{n\_out} \cdot S_{rel} \quad (14)$$

Data ($L_{n\_out}$, $M_{n\_out}$, $S_{n\_out}$) in the expression (14) is obtained from expressions (15). ($L_{paper\_out}$, $M_{paper\_out}$, $S_{paper\_out}$) in the expressions (15) is obtained by applying the Hunt-Pinter-Estevez conversion, shown in the expression (11), to the data ($X_{paper\_out}$, $Y_{paper\_out}$, $Z_{paper\_out}$) output from the sensor $S_3$. In the same way, ($L_{ill\_out}$, $M_{ill\_out}$, $S_{ill\_out}$) is obtained by applying the Hunt-Pinter-Estevez conversion to the data ($X_{ill\_out}$, $Y_{ill\_out}$, $Z_{ill\_out}$) output from the sensor $S_4$.

$$L_{n\_out} = R_{adp} \cdot L_{paper\_out} + (1 - R_{adp}) \cdot L_{ill\_out}$$

$$M_{n\_out} = R_{adp} \cdot M_{paper\_out} + (1 - R_{adp}) \cdot M_{ill\_out}$$

$$S_{n\_out} = R_{adp} \cdot S_{paper\_out} + (1 - R_{adp}) \cdot S_{ill\_out} \quad (15)$$

The color signal D33 at the pyramidal level shown in FIG. 7 is converted to a color signal D4 which is not dependent on the device by the conversion circuit 52.

In other words, in this case, the conversion circuit 52 performs the conversion reverse to that in the case shown in the expression (11) to generate data ($X_{out}$, $Y_{out}$, $Z_{out}$) from the data ($L_{out}$, $M_{out}$, $S_{out}$) input from the luminous-environment conversion circuit 15.

$$\begin{pmatrix} X_{out} \\ Y_{out} \\ Z_{out} \end{pmatrix} = \begin{pmatrix} 1.91019 & -1.11214 & 0.20195 \\ 0.37095 & 0.62905 & 0 \\ 0 & 0 & 1.00000 \end{pmatrix} \begin{pmatrix} L_{out} \\ M_{out} \\ S_{out} \end{pmatrix} \quad (16)$$

Next, the color signal D4 shown in FIG. 7, which is not dependent on the device, is converted to an output image color signal D5 with the use of the profile $P_2$ in the converter 16.

In other words, the converter 16 performs the calculation indicated by the following expression.

$$\begin{pmatrix} C_{out} \\ M_{out} \\ Y_{out} \end{pmatrix} = LUT_I \begin{pmatrix} X_{out} \\ Y_{out} \\ Z_{out} \end{pmatrix} \quad (17)$$

Figure 8:
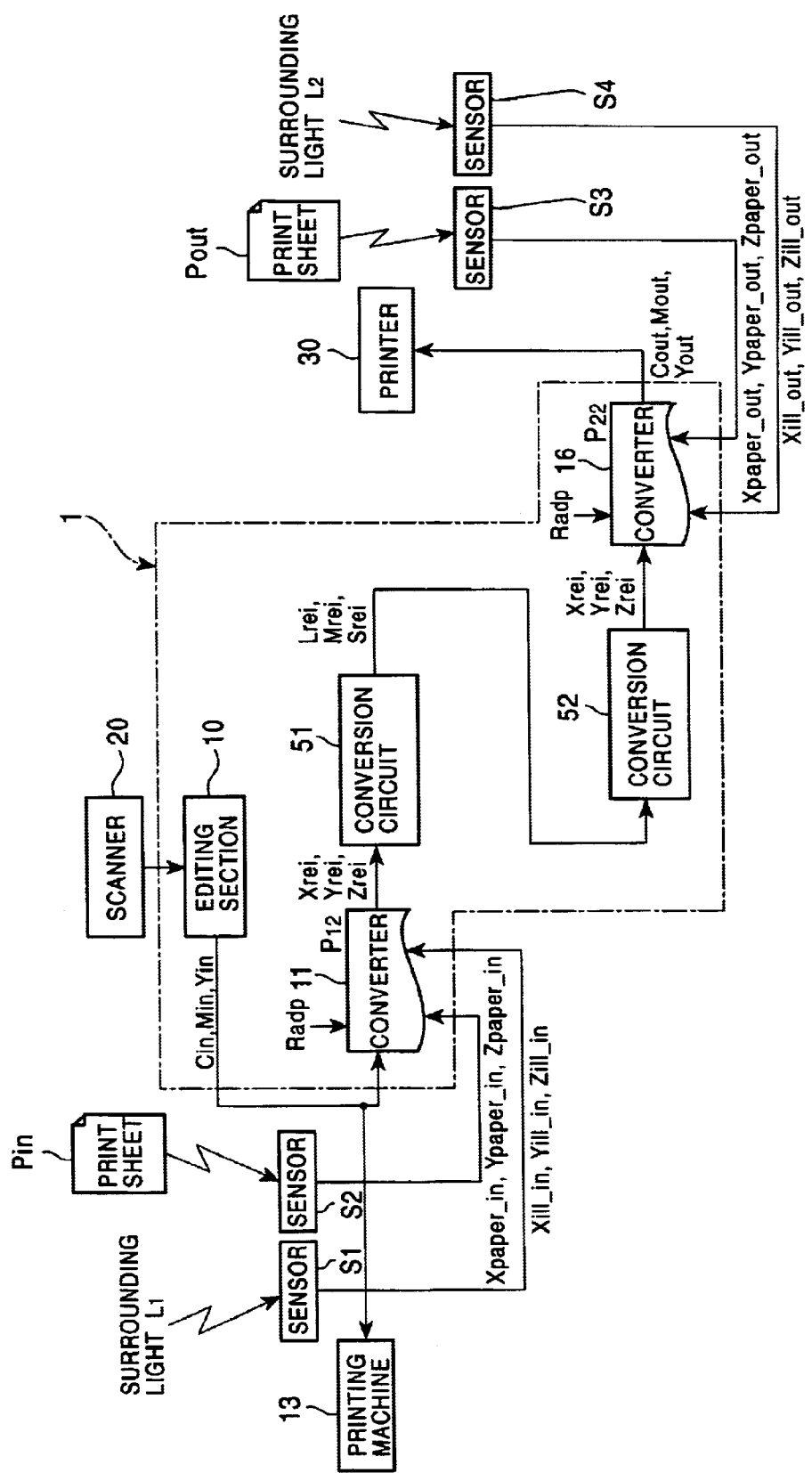
FIG. 8 is a block diagram of still another configuration example of an image processing apparatus to which the present invention is applied.

FIG. 8 shows yet another embodiment. In this embodiment, the luminous-environment conversion circuit 12 and the luminous-environment conversion circuit 15 are omitted from the embodiment shown in FIG. 6. The other configurations are the same as those in the case shown in FIG. 6.

In other words, in the embodiment shown in FIG. 8, an input image color signal D1 is converted to a color signal D301 in which adaptation is considered, by the use of the profile $P_{12}$ in the converter 11. Namely, the converter 11 performs the calculation indicated by the following expression.

$$\begin{pmatrix} X_{rel} \\ Y_{rel} \\ Z_{rel} \end{pmatrix} = LUT_{IN} \begin{pmatrix} C_{in} \\ M_{in} \\ Y_{in} \end{pmatrix} \quad (18)$$

Figure 9:
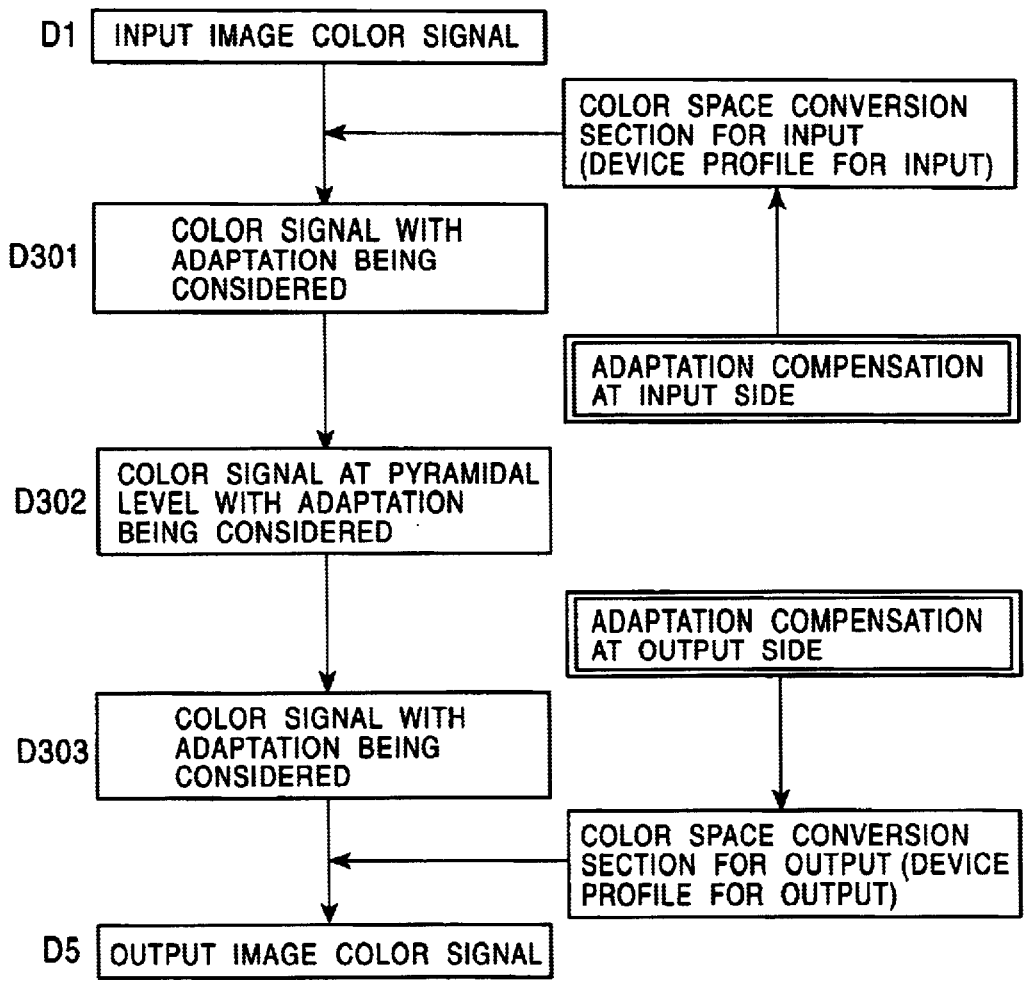
FIG. 9 is a view used for describing an operation of the configuration example shown in FIG. 8.

The conversion circuit 51 applies the Hunt-Pointer-Estevez conversion to the data ($X_{rel}$, $Y_{rel}$, $Z_{rel}$) input from the converter 11 and serving as the color signal D301, in which adaptation is considered, to convert to data ($L_{rel}$, $M_{rel}$, $S_{rel}$) serving as a color signal D302 at the pyramidal level in which adaptation is considered, as shown in FIG. 9.

The conversion circuit 52 applies the conversion reverse to that in the conversion circuit 51 to the input data ($L_{rel}$, $M_{rel}$, $S_{rel}$) to convert to data ($X_{rel}$, $Y_{rel}$, $Z_{rel}$). In other words, the color signal D302 at the pyramidal level shown in FIG. 9, in which adaptation is considered, is converted to a color signal D303 in which adaptation is considered.

The converter 16 then converts the color signal D303, in which adaptation is considered, to an output image color signal D5.

Namely, the converter 16 generates data ($C_{out}$, $M_{out}$, $Y_{out}$) from the data ($X_{rel}$, $Y_{rel}$, $Z_{rel}$) input from the conversion circuit 52, with the profile $P_{22}$ being referenced. In other words, the converter 16 performs the calculation indicated by the following expression.

$$\begin{pmatrix} C_{out} \\ M_{out} \\ Y_{out} \end{pmatrix} = LUT_I \begin{pmatrix} X_{rel} \\ Y_{rel} \\ Z_{rel} \end{pmatrix} \quad (19)$$

Figure 10:
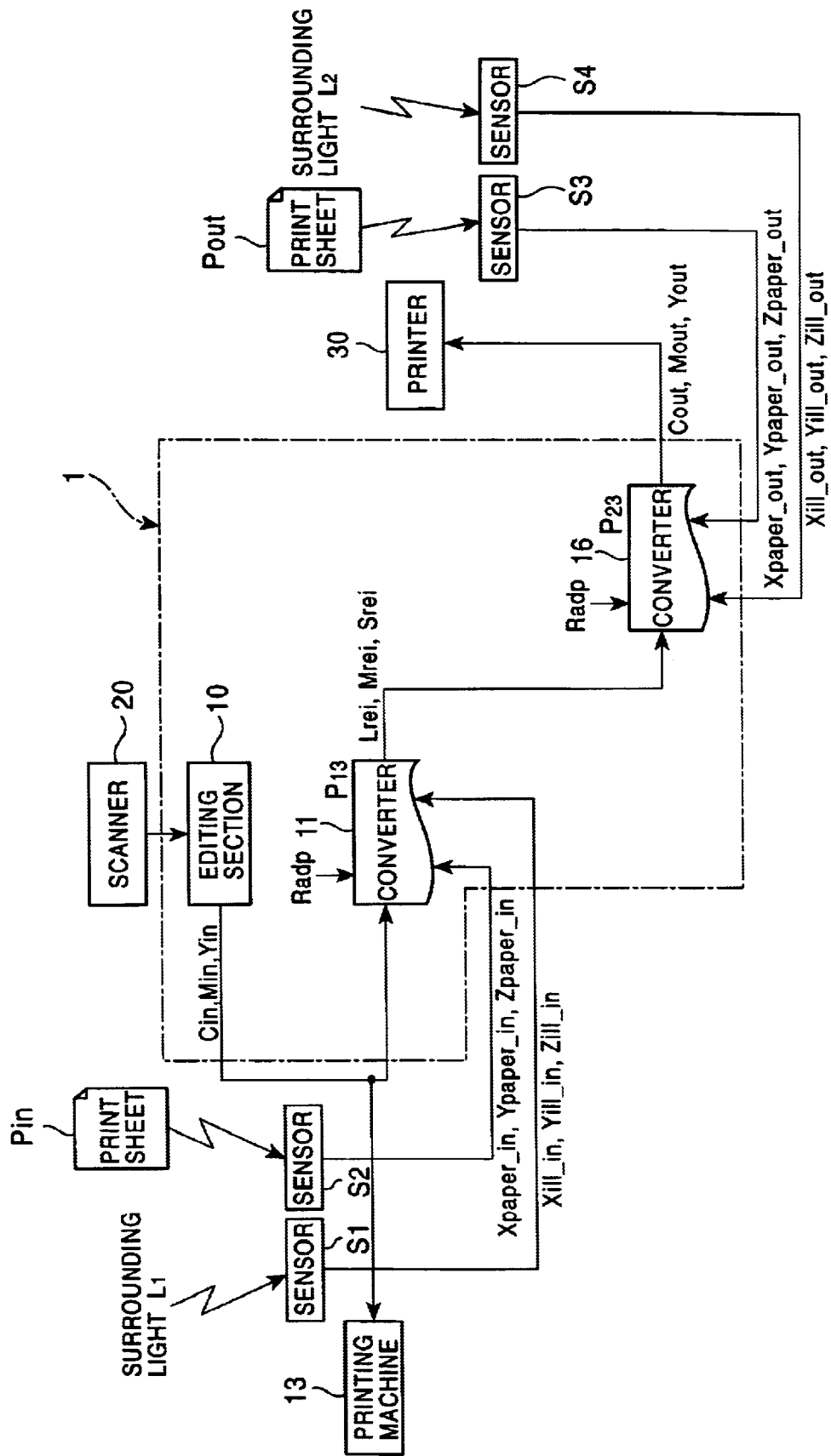
FIG. 10 is a block diagram of a further configuration example of an image processing apparatus to which the present invention is applied.

An embodiment shown in FIG. 10 is obtained by further simplifying the configuration of the embodiment shown in FIG. 8. In the embodiment shown in FIG. 10, the conversion circuit 51 and the conversion circuit 52 shown in FIG. 8 are omitted and the functions thereof are substantially included in a profile $P_{13}$ in the converter 11 and a profile $P_{23}$ in the converter 16. The other configurations are the same as those shown in FIG. 8.

Figure 11:
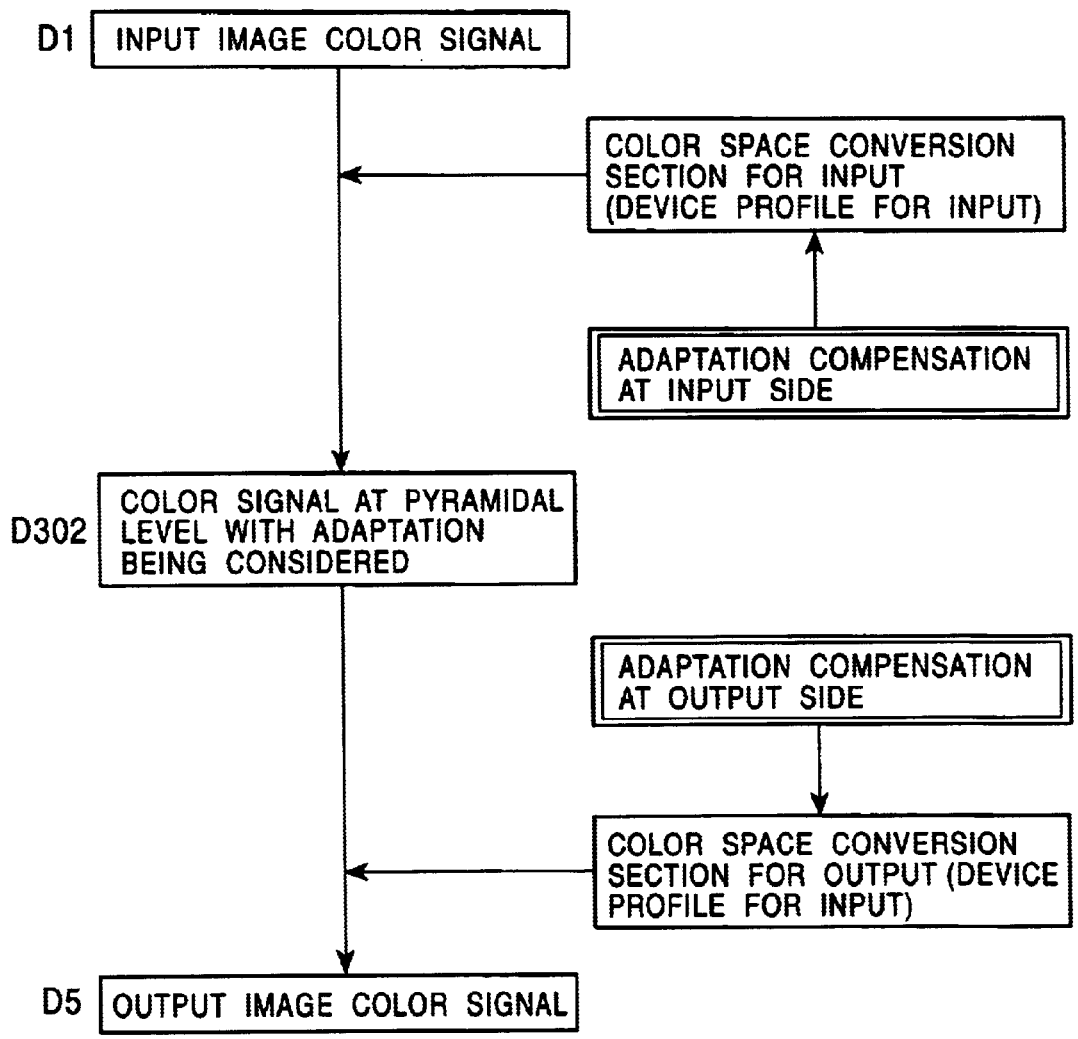
FIG. 11 is a view used for describing an operation of the configuration example shown in FIG. 10.

In other words, in the present embodiment, as shown in FIG. 11, an input image color signal D1 output from the editing section 10 is converted by the use of the profile $P_{13}$ to a color signal D302 at the pyramidal level in which adaptation is considered. Namely, the converter 11 performs calculation according to the following expression.

$$\begin{pmatrix} L_{rel} \\ M_{rel} \\ S_{rel} \end{pmatrix} = LUT_N \begin{pmatrix} C_{in} \\ M_{in} \\ Y_{in} \end{pmatrix} \quad (20)$$

On the other hand, the converter 16 converts the received color signal D302 at the pyramidal level, in which adaptation is considered, to an output image color signal D5 with the use of the profile $P_{23}$. Namely, the converter 16 performs calculation according to the following expression.

$$\begin{pmatrix} C_{out} \\ M_{out} \\ Y_{out} \end{pmatrix} = LUT_I \begin{pmatrix} L_{rel} \\ M_{rel} \\ S_{rel} \end{pmatrix} \quad (21)$$

Figure 12:
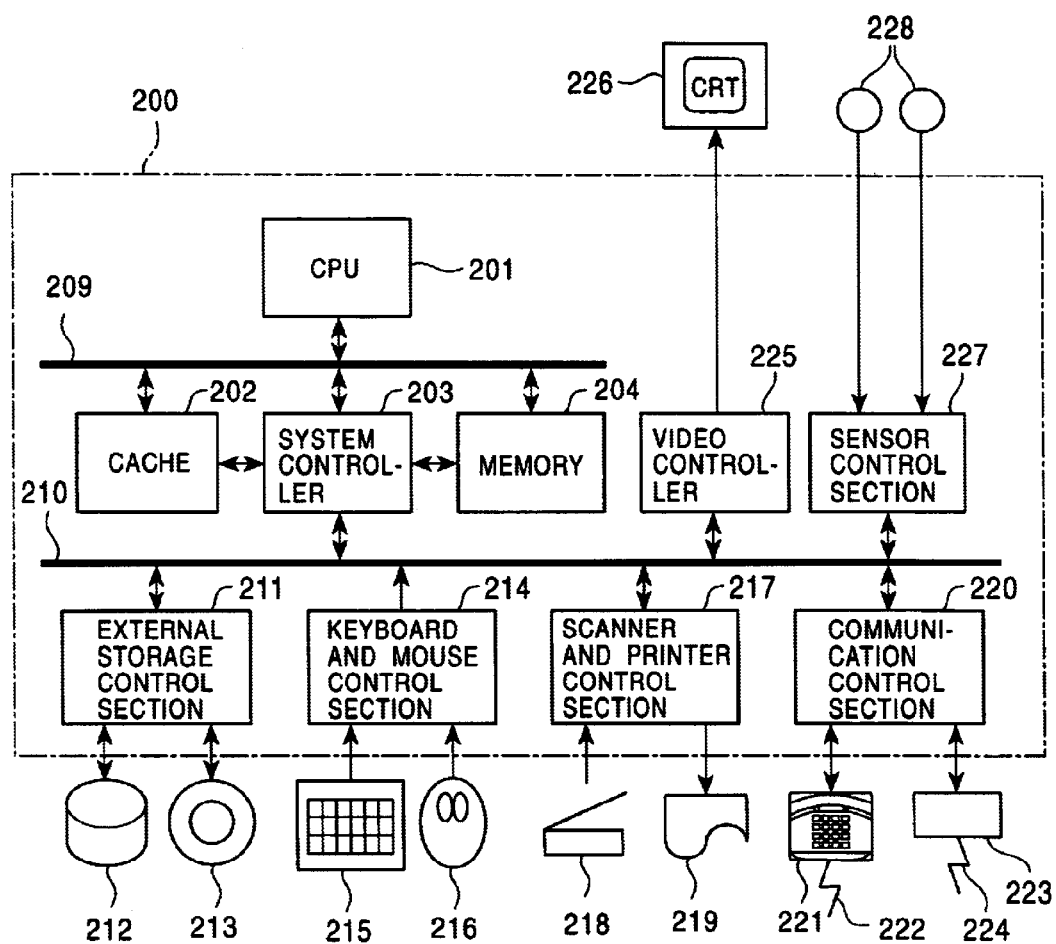
FIG. 12 is a block diagram of a specific configuration example of an image processing apparatus 1 shown in FIG. 1.
Figure 13:
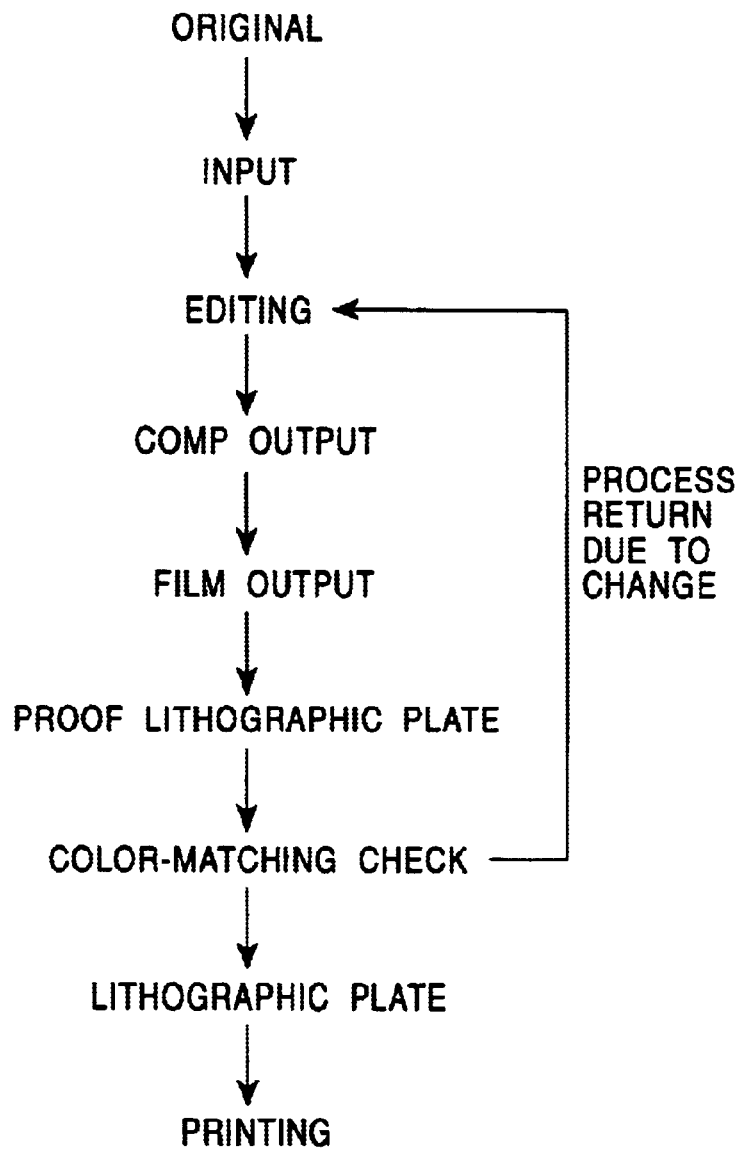
FIG. 13 is a view used for describing a printing flow.
Figure 14:
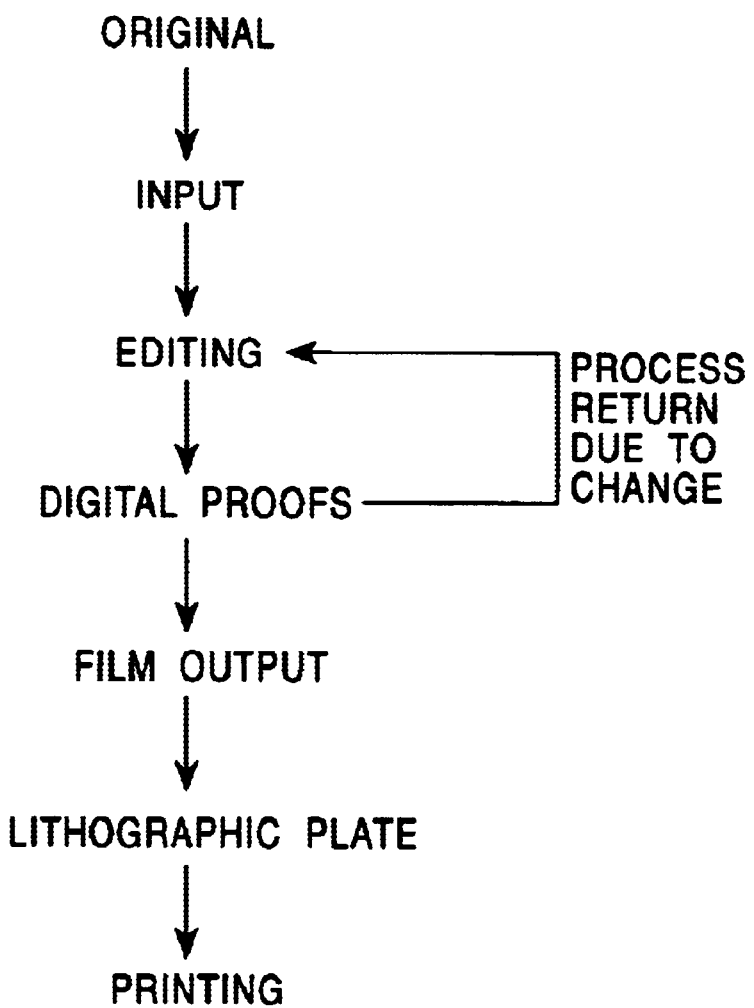
FIG. 14 is a view used for describing another printing flow.
Figure 15:
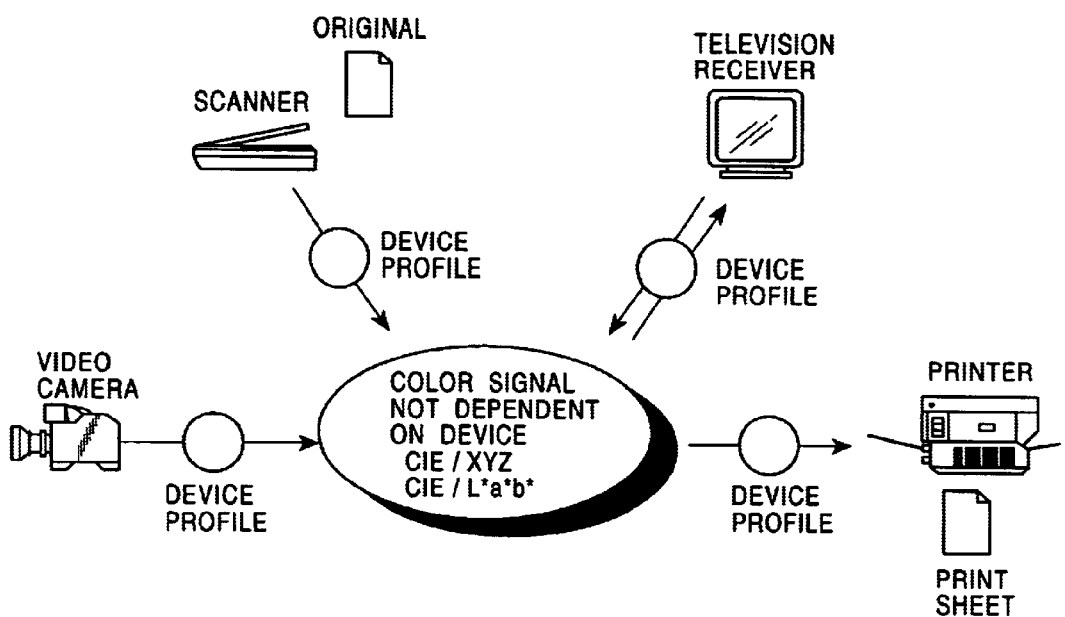
FIG. 15 is a view used for describing a color management system (CMS).
Figure 16:
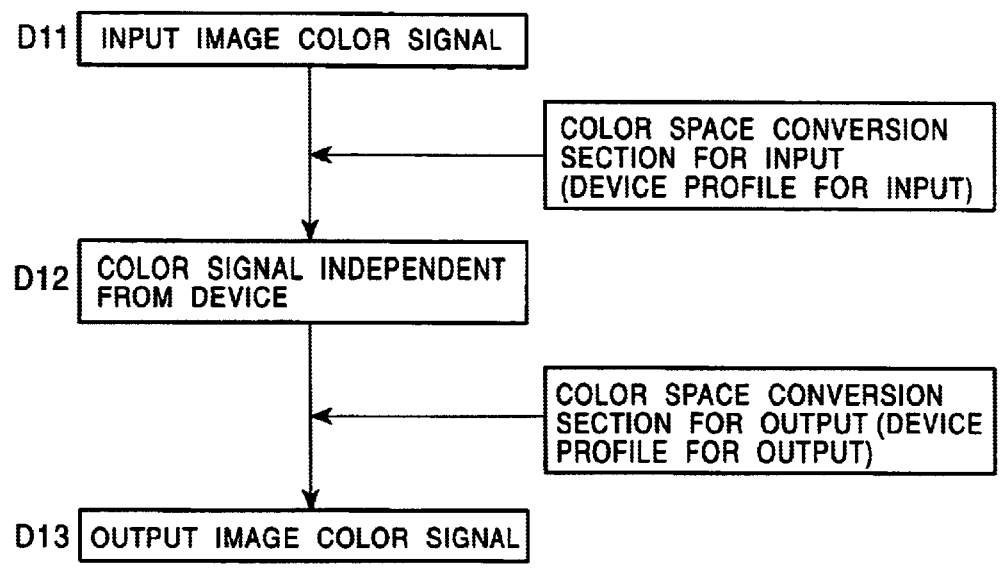
FIG. 16 is a view used for describing the printing flow shown in FIG. 14.

The above-described image processing apparatus 1 is formed of a computer, such as a personal computer. FIG. 12 shows a configuration example of a computer 2000 which constitutes such an image processing apparatus 1. This computer 2000 is obtained by adding a sensor, a communication unit, etc., as required, to a personal computer currently available.

A CPU 201 has functions for controlling the whole apparatus and for calculation, and is formed, for example, of a Pentium (trademark) of Intel Corporation. A cache 202 is a high-speed storage section for storing information stored in a memory and frequently accessed by the CPU 201. With direct information transfer between the CPU 201 and the cache 202, the system can perform high-speed processing.

A system controller 203 is a circuit section for adjusting timing among the CPU 201, the cache 202, a memory 204, a computer bus 209, and a PCI bus 210, and is formed, for example, of TRITON (430FX) (trademark) of Intel Corporation.

The memory 204 is a storage section for information write and read according an instruction of the CPU 201 or the system controller 203, and is formed, for example, of a DRAM (dynamic random access memory). The memory 204 is connected to the CPU 201 and various resources on the computer bus 209 through the system controller 203 and stores information. Of course, the memory 204 can store the above-described image data.

The computer bus 209 is information transfer means directly connected to the CPU 201 and can transfer information with the cache 202 and the system controller 203 at a high speed. The PCI bus 210 is information transfer means separated from the computer bus 209, and is connected to the system controller 203. The CPU 201 can access through the system controller 203 various resources connected to the PCI bus 210.

An external storage control section 211 is connected to the PCI bus 210 and a hard disk 212 and a CD-ROM drive 213, and controls information write and read operations to and from a certain area in a disk mounted on the hard disk 212 or the CD-ROM drive 213 according to an information access request sent through the PCI bus 210. For example, these connections are performed by SCSI or IEEE 1394. An external storage unit is not limited to the hard disk 212 or the CD-ROM 213, and can be a unit which uses a writable and removable recording medium, such as a floppy disk and a magneto-optical disk. In that case, the data required for the present invention, such as image data for which the above-described conversion is performed, a luminous-environment parameter, and appearance index data, is stored in the recording medium and transferred, instead of being transmitted and received.

A keyboard and mouse control section 214 connects a keyboard 215 and a mouse 216 serving as a pointing device to the PCI bus 210, and transfers to the CPU according to a certain sequence a character, a numeral, and a symbol which the user inputs or the movement of the mouse and the operation of a mouse button which the user performs. With this function, the CPU 201 receives the user input information while the CPU 201 relatively moves a pointer displayed together with an image displayed on a CRT (cathode ray tube) monitor 226 through a video controller 225. Of course, an input on the above-described setting screen is also possible in the same way.

A scanner and printer control section 217 is connected to the PCI bus 210 and a scanner 218 and a printer 219, and controls image-information write and read operations according to an information access request sent through the PCI bus 210. These connections are usually performed by SCSI or IEEE 1394. Information to be transferred includes information read or input optically, information to be printed or output, and in addition, device characteristic information stored in the scanner 218 or the printer 219 and used for the above-described DIC and DDC conversion.

A communication control section 220 is connected to a telephone line 222 through a modem 221 or connected to a network 224, such as IEEE 802.3 (Ethernet), FDDI, ATM, or IEEE 1394, through a network communication unit 223, such as a transceiver or a hub, and controls information transmission and receiving according to an information access request through the PCI bus 210 or an information access request from a communication destination. Of course, the data required for the present invention, such as image data for which the above-described conversion is performed, a luminous-environment parameter, and appearance index data, can be transmitted and received.

The video controller 225 is connected to the PCI bus 210, and draws information such as an image, a figure, or a character on a video memory (not shown) of the video controller 225 and displays the contents on the CRT monitor 226. Of course, the above-described image data can be stored in the video memory of the video controller 225. Device characteristic information, such as the VESA DDC (display data channel) specification, stored in the CRT monitor 226 can also be transferred between the video controller 225 and the CRT monitor 226.

The CRT 226 is connected to the above video controller 225, and displays an image which the video controller draws, according to an instruction of the CPU 201. Of course, instead of the CRT monitor, other display devices such as a PDP (plasma display panel) and a liquid-crystal display can be used. In the present invention, the CRT monitor 226 also displays a soft copy image in cooperation with the video controller 225, and achieves an input device function for an image which a user observes at the transmission end and an output device function for an image which another user observes at the receiving end.

A sensor control section 227 is connected to the PCI bus 210 and various sensors 228, and detects a physical amount such as a voltage, a temperature, or brightness, according to an instruction of the CPU 201. In the embodiments of the present invention, the sensor control section plays a role as a sensor for measuring a luminous-environment parameter, and detects the chromaticity of surrounding light, the chromaticity of the CRT monitor 226, and the absolute luminance.

In the above descriptions, an observation light source is taken into account as a luminous environment. Other luminous environments can be taken into consideration.

As a transfer medium for transferring a computer program that performs the above-described processing to the user, a recording medium such as a magnetic disk, a CD-ROM, and a solid-state memory, and a communication medium such as a network and satellite can be used.

What is claimed is:

1. An image processing apparatus for matching the chromatic appearance of an image written from a first image output apparatus and printed onto a first hard copy recording medium having a background color associated therewith to the chromatic appearance of an image written from a second image output apparatus and printed onto a second hard copy recording medium having a background color associated therewith comprising:

first determining means for determining the background color of the first hard copy recording medium and luminous-environment data associated therewith;

second determining means for determining the background color of the second hard copy recording medium and luminous-environment data associated therewith, and for determining the chromatic appearance of the image printed on the second hard copy recording medium in accordance with the determined background color and luminous-environment data;

first conversion means for converting device dependent color data of the image printed onto the second hard copy recording medium into device independent color data in accordance with the determined chromatic appearance of the image printed on the second hard copy recording medium;

compensation means for compensating the device independent color data as a function of the background color and the luminous-environment data determined by said second determining means and the background color and the luminous-environment data obtained by said first determining means; and second conversion means for converting the device independent color data compensated by said compensation means to device dependent color data in accordance with the determined background color of the first hard copy recording medium and the determined luminous-environment data associated with the first hard copy recording medium indicative of the image printed onto the first hard copy recording medium.

2. The apparatus of claim 1, wherein said first and second hard copy recording media comprise paper.

3. The apparatus of claim 1, wherein said first and second recording media comprise colored hard copy recording media.

4. An image processing method for matching the chromatic appearance of an image written from an image written from a first image output apparatus and printed onto a first hard copy recording medium having a background color associated therewith to the chromatic appearance of an image written from a second image output apparatus and printed onto a second hard copy recording medium having a background color associated therewith, comprising the steps of:

determining the background color of the first hard copy recording medium and luminous-environment data associated therewith;

determining the background color of the second hard copy recording medium and luminous-environment data associated therewith, and for determining the chromatic appearance of the image printed on the second hard copy recording medium in accordance with the determined background color and luminous-environment data;

converting device dependent color data of the image printed onto the second recording medium into device independent color data in accordance with the determined chromatic appearance of the image printed on the second hard copy recording medium;

compensating the device independent color data as a function of the background color and the luminous-environment data associated with said first recording medium and the background color and the luminous-environment data associated with said second recording medium; and converting the device independent color data to device dependent color data in accordance with the determined background color of the first hard copy recording medium and the determined luminous-environment data associated with the first hard copy recording medium indicative of the image printed onto the first hard copy recording medium.

5. The method of claim 4, wherein said first and second hard copy recording media comprise paper.

6. The method of claim 4, wherein said first and second hard copy recording media comprise colored hard copy recording media.

7. A storage medium for storing a computer program which matches the chromatic appearance of an image written from a first image output apparatus and printed onto a first hard copy recording medium having a background color associated therewith to the appearance of an image to be output from a second image output apparatus and printed on a second hard copy recording medium having a background color associated therewith, the computer carrying out the steps of:

determining the background color of the first hard copy recording medium and luminous-environment data associated therewith;

determining the background color of the second hard copy recording medium and luminous-environment data associated therewith, and for determining the chromatic appearance of the image printed on the second hard copy recording medium in accordance with the determined background color and luminous-environment data;

converting device dependent color data of the image printed onto the second hard copy recording medium into device independent color data in accordance with the determined chromatic appearance of the image printed on the second hard copy recording medium;

compensating the device independent color data as a function of the background color and the luminous-environment data associated with said first determining step and the background color and the luminous-environment data associated with said second determining step; and converting the device independent color data to device dependent color data in accordance with the determined background color of the first hard copy recording medium and the determined luminous-environment data associated with the first hard copy recording medium indicative of the image printed onto the first hard copy recording medium.

8. The method of claim 7, wherein said first and second hard copy recording media comprise paper.

9. The method of claim 7, wherein said first and second hard copy recording media comprise color hard copy recording media.

* * * * *